(12) United States Patent
Ohguro et al.

(10) Patent No.: US 6,660,957 B1
(45) Date of Patent: Dec. 9, 2003

(54) APPARATUS FOR ELECTRIC DISCHARGE MACHINING

(75) Inventors: Hiroyuki Ohguro, Tokyo (JP); Seiji Satou, Tokyo (JP); Akihiko Iwata, Tokyo (JP); Akihiro Suzuki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/958,649

(22) PCT Filed: May 15, 2000

(86) PCT No.: PCT/JP00/03098

§ 371 (c)(1),
(2), (4) Date: Oct. 11, 2001

(87) PCT Pub. No.: WO01/87526

PCT Pub. Date: Nov. 22, 2001

(51) Int. Cl.⁷ ............... B23H 1/02; B23H 7/14
(52) U.S. Cl. .................................. 219/69.13
(58) Field of Search ............... 219/69.13, 69.18

(56) References Cited

U.S. PATENT DOCUMENTS

| | | | | |
|---|---|---|---|---|
| 4,681,997 A | * | 7/1987 | Inoue et al. | 219/69.13 |
| 6,107,593 A | * | 8/2000 | Tsai et al. | 219/69.13 |

FOREIGN PATENT DOCUMENTS

| | | | |
|---|---|---|---|
| EP | 689893 | | 1/1996 |
| JP | SHO 57-53819 | | 3/1982 |
| JP | 1-295716 | | 11/1989 |
| JP | HEI 4-10589 | | 4/1992 |
| JP | HEI 5-9209 | | 2/1993 |
| JP | HEI 6-79532 | | 3/1994 |
| JP | 10-118847 A | * | 5/1998 |

* cited by examiner

Primary Examiner—Geoffrey S. Evans
(74) Attorney, Agent, or Firm—Sughrue Mion, PLLC

(57) ABSTRACT

A power supply apparatus for electric discharge machining is provided with a current loop including a diode, which is supplied with a forward current at the same time a voltage for generating a discharge is output or before it; and a resistor. Supply of forward current to the diode is blocked the moment a discharge is generated. By doing so, a reverse recovery current of the diode is supplied in a gap between an electrode and a workpiece to be machined.

7 Claims, 8 Drawing Sheets

FIG.2
(a)
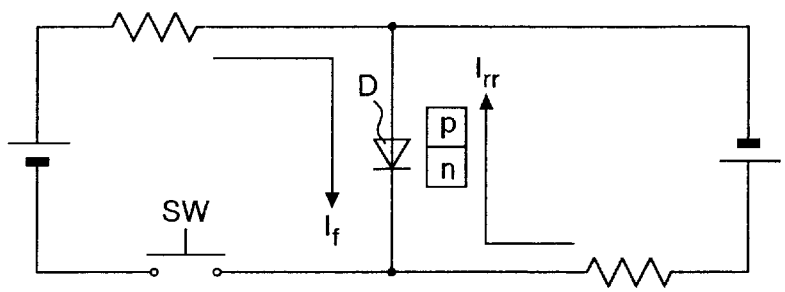
(b)
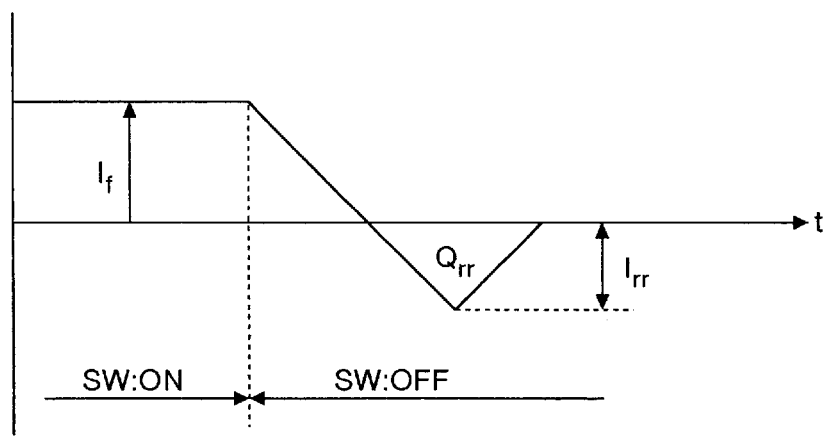
(c)
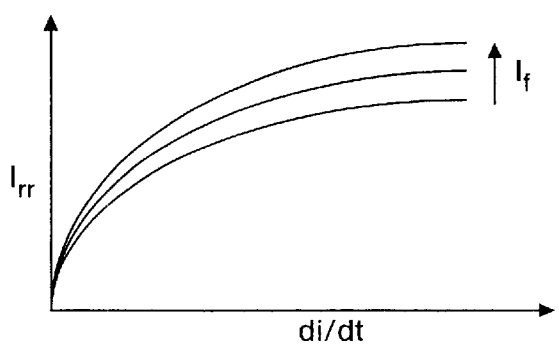

APPARATUS FOR ELECTRIC DISCHARGE MACHINING

TECHNICAL FIELD

The present invention relates to a power supply apparatus for electric discharge machining. More particularly, this invention to a transistor type power supply apparatus for electric discharge machining, which can generate an intermittent pulse current using a semiconductor switching element.

BACKGROUND ART

Conventionally, there is known a power supply apparatus for an electric discharge machine which supplies an intermittent pulse current to a working distance formed between an electrode and a workpiece via a working fluid, and carries out electric discharge machining while controlling a relative position between the electrode and the workpiece by numerical control. The transistor type power supply apparatus for electric discharge machining is, for example, a representative of the above-mentioned power supply apparatus. This transistor type power supply apparatus for electric discharge machining generates an intermittent pulse current by a semiconductor switching element repeating an on-off operation.

This type of power supply apparatus for electric discharge machining will be described below with reference to FIG. 7(a) and FIG. 7(b). FIG. 7(a) shows a circuit configuration of the conventional power supply apparatus for electric discharge machining, and FIG. 7(b) shows a drive control system thereof.

The above power supply apparatus for electric discharge machining has a switching circuit for supplying a pulse current to a workpiece W and an electrode E. This switching circuit includes the first switching circuit 20 and the second switching circuit 30 connected parallel with each other.

The first switching circuit 20 is composed of the direct current voltage source V21, semiconductor switching elements S21, S22, S23 and S24 such as a FET or the like, and the current limiting resistor R21. On the other hand, the second switching circuit 30 is composed of the direct current voltage source V31, semiconductor switching elements S31 and S32, and diodes D31 and D32.

In FIG. 7(a), L21, L22, L31 and L32 denote a stray inductance of circuit, and C11 denotes a stray capacitance.

A drive control system of the power supply apparatus for electric discharge machining includes a discharge detecting circuit 31, an oscillation control circuit 32, a drive circuit 33 and a drive circuit 34. In this case, the drive circuit 33 drives and controls the semiconductor switching elements S21, S22, S23 and S24 of the above first switching circuit 20. On the other hand, the drive circuit 34 drives and controls the semiconductor switching elements S31 and S32 of the above second switching circuit 30.

Subsequently, operation of the power supply apparatus for electric discharge machining will be explained below. Assuming that a gap between the electrode E and the workpiece W ("between the electrodes") is such that discharge or short-circuit does not occur, and when the switching elements S22 and S23 are turned off while the switching elements S21 and S24 are turning on, a voltage of the direct current voltage source V21 appears between the electrodes. Simultaneously, the stray capacitance C11 of the circuit is charged by the voltage of the direct current voltage source V21. A distance between the electrode E and the workpiece W is controlled by a numerical control device (not shown) and a servo drive control device so that a discharge is generated between the electrodes. When a discharge is generated by an output voltage of the direct current voltage source V21, first, a charge charged in the stray capacitance C11 of the circuit is discharged as capacitor to the inter-electrode, and thereby, a discharge start current Ic flows through there. By doing so, a conductive path is formed in the inter-electrode.

In order to maintain the conductive path thus formed, a current must be continuously supplied to the inter-electrode after the charge of the stray capacitance C11 of the circuit has been fully discharged; therefore, the switching elements S21 and S24 are kept as they are turned on.

From the direct current voltage source V21, a discharge holding current $I_R$ flows to the resistor R21, switching element S21, circuit inductance L21, workpiece W, electrode E, circuit inductance L22, switching element S24 and direct current voltage source V21 in succession, and thereby, the conductive path formed between the electrodes is maintained. In this case, the discharge holding current $I_R$ flows through the resistor R21; therefore, the maximum value of the discharge holding current $I_R$ is limited to $I_R$ (max)=V21/R21 by the resistor R21.

The discharge holding current $I_R$ is a relatively small current, and it is too weak for machining. Therefore, the discharge holding current $I_R$ has a function as pre-discharge current for supplying a large-current discharge machining current $I_S$, which will be described latter.

Moreover, when turning off the switching elements S21 and S24 while turning on the switching elements S22 and S23, the above operation is carried out in a pattern of reversing a polarity of output voltage and current with respect to the gap between the electrodes.

The discharge holding current $I_R$ is a current appearing in between the electrodes at the same time with the generation of discharge. On the other hand, the large-current discharge machining current $I_S$ is supplied between the electrodes after the generation of discharge is detected. In this case, the large-current discharge machining current $I_S$ is output between the electrodes in a state of being delayed for a certain time from the first generation of discharge, as described latter.

The discharge detecting circuit 31 detects a drop of voltage between the electrodes ("inter-electrode voltage") by the generation of discharge between the electrodes, and gives an instruction of large-current output to the oscillation control circuit 32. The oscillation control circuit 32 outputs a pulse signal having a time width set by a machining state between the electrodes to the drive circuit 34. The drive circuit 34 simultaneously drives on (turns on) the switching elements S31 and S32 only for the time width set in the oscillation control circuit 32.

When the switching elements S21, S24, S31 and S32 are all in an on state, a circuit is formed such that a plurality of direct current voltage sources having different voltage is connected. For this reason, there is a possibility of breaking down these elements of the circuit by a potential difference including a serge voltage. Thus, in the case of turning on the switching elements S31 and S32, the switching elements S21 and S24 are turned off as safety measures.

The switching elements S31 and S32 are simultaneously turned on, and thereby, from the direct current voltage source V31, the large-current discharge machining current $I_S$ flows to the switching element S31, circuit inductance L31, workpiece W, electrode E, circuit inductance L32, switching element S32 and direct current voltage source V31 in succession.

When no pulse signal is output from the oscillation control circuit 32, the drive circuit 34 drives off the switching elements S31 and S32. The discharge machining current $I_S$ continuously flows through the circuit by the induction of the circuit inductances L31 and L32; however, it is fed back and regenerated to the direct current voltage source V31 via the diode D32, circuit inductance L31, workpiece W, electrode E, circuit inductance L32, diode 31 and direct current voltage source V31.

FIG. 8 shows a waveform of discharge machining current obtained by the above operation in the conventional power supply apparatus and an output timing of each control signal. In FIG. 8, $V_{WE}$ denotes the inter-electrode voltage, and $I_C$ denotes a discharge start current by capacitor discharge of the stray capacitance C11 of circuit. Further, $I_R$ denotes a discharge holding current output from the first switching circuit 20, and $I_S$ denotes a discharge machining current output from the second switching circuit 30. Further, PK denotes a discharge detection output signal, PC denotes an oscillation control output signal, PD denotes a drive signal of semiconductor switching element, and $I_{WE}$ denotes an inter-electrode current.

The moment a discharge is generated between the electrodes, the discharge start current $I_C$ by the capacitor discharge of the stray capacitance C11 of the circuit appears between the electrodes. After the discharge is generated between the electrodes, the switching elements S21 and S24 of the first switching circuit 20 are being turned on, and therefore, the moment a conductive path is formed between the electrodes by the discharge start current $I_C$, the discharge holding current $I_R$ starts to be output from the first switching circuit 20.

The discharge holding current $I_R$ is output between the electrodes via the inductances L21 and L22 of the circuit. Therefore, the discharge holding current $I_R$ does not rise instantaneously, and starts to flow at the gradient of V21/(L21+L22). In this case, the discharge holding current $I_R$ is limited by the resistor R21 as described before; for this reason, it does not reach the maximum value $I_R$ (max)=V21/R21 or more. The switching elements S21 and S24 are turned off until the switching elements S31 and S32 of the second switching circuit 30 are turned on; therefore, the discharge holding current $I_R$ has been output by that time.

On the other hand, the discharge is generated, and thereby, the inter-electrode voltage $V_{WE}$ drops to a discharge voltage Va; for this reason, the discharge detection circuit 31 detects the voltage drop, and then, outputs a discharge detection signal PK. However, in this case, a delay time is generated to detect the generation of discharge, and a time takes to output a signal; for this reason, the discharge detection signal PK is output after the time tk from the moment of the discharge is generated.

The oscillation control circuit 32 receives the discharge detection signal PK, and then, outputs an oscillation control signal PC. However, in this case, a delay time tc is generated likewise. Moreover, a delay time td is generated in an output signal PD of the drive circuit, and a delay time ts is generated in the switching element, likewise. Therefore, the discharge machining current $I_S$ appears between the electrodes after time tr (=tk+tc+td+ts) from the point of time t0 when the discharge is generated. The discharge machining current $I_S$ is a current output from the second switching circuit 30 via the inductances L31 and L32, and does not rise instantaneously as the discharge holding current $I_R$. Further, the discharge machining current $I_S$ continues to increase at the gradient of V31/(L31+L32) for the duration of the switching elements S31 and S32 being turned on. Usually, the voltage of the direct current voltage source V31 is set about two to thee times higher than that of the direct current voltage source V21. Therefore, the gradient of the rise of the discharge machining current $I_S$ becomes steeper than that of the rise of the discharge holding current $I_R$.

When the switching elements S31 and S32 are turned off, the discharge machining current. $I_S$ drops. The inter-electrode current $I_{WE}$ is a current having a relation of $I_{WE}=I_C+I_R+I_S$. The discharge holding current $I_R$ output from the first switching circuit 20 is supplied so as to supplement a time gap between the first discharge start current $I_C$ and the final large-current discharge machining current $I_S$, and thereby, discharge machining is repeatedly carried out while maintaining a discharge state between the electrodes without interrupting the inter-electrode current $I_{WE}$.

However, in the above conventional power supply apparatus for electric discharge machining, the upper limit value of the discharge holding current $I_R$ is limited by the resistor R21, and the current value is low in the initial state of transient state by the inductances L21 and L22 of the circuit. For this reason, the conductive path between the electrodes formed after the generation of discharge is not maintained. As a result, sometimes the supply of the discharge machining current $I_S$ fails. In particular, in a large-scale electric discharge machine, a distance between the power supply and the machine main body becomes long, and further, a feed cable for connecting between them inevitably becomes long. For this reason, the inductance of circuit becomes large, and there is the case where the discharge holding current $I_R$ does not rise after the discharge start current $I_C$ disappears; as a result, the conductive path formed between the electrodes is interrupted.

Further, in the resistor R21, there exists an inductance component by resistance windings, and in the case where the inductance of resistor becomes inevitably large in order to obtain a necessary resistance value, there is an influence of further disturbing the rise of discharge holding current $I_R$.

Furthermore, the first discharge start current $I_C$ is a current by capacitor discharge, and in fact, includes an oscillating component. For this reason, even if the maximum value of the discharge holding current $I_R$ is previously set slightly larger, the discharge holding current $I_R$ is offset by a negative component of the oscillation; as a result, the conductive path formed between the electrodes is interrupted.

As described above, when the conductive path between the electrodes secured by the discharge start current $I_C$ is interrupted before the discharge machining current $I_S$ is supplied, it is impossible to obtain the operation of stably supplying the discharge machining current $I_S$ between the electrodes by a pre-discharge current. As a result, various faults are generated in discharge machining.

In a state that the conductive path formed between the electrodes is interrupted, the output of the second switching circuit power supply apparatus 30 is an open state; for this reason, no discharge machining current $I_S$ flows, and in this case, normal discharge machining is not carried out. When the above state frequently occurs, the number of effective discharge times is reduced; as a result, a problem arises such that a machining (working) speed to be inherently obtained is not obtained, and it is impossible to further improve the above machining speed.

In order to output a large current for a short time, the voltage of the direct current voltage source V31 is usually set about two to three times higher than that of the direct current voltage source V21. However, in the case where no conductive path is formed between the electrodes and the circuit is an open state, a high voltage of the direct current voltage source V31 is applied between the electrodes. In other words, a discharge is newly generated by the high voltage, and thereafter, a large current is suddenly applied between the electrodes without generating a pre-discharge. For this reason, in the case where the electrode E is a thin electrode such as a wire electrode, the wire electrode is disconnected, and further, a machining surface becomes coarse even if no disconnection is generated in the electrode, and therefore, this is a factor of deteriorating a machining accuracy. As a result, a problem arise such that a stable discharge machining characteristic is not obtained.

The above problem has been pointed out in a power supply apparatus for wire cut discharge machine disclosed in Japanese Patent Application Publication No. 5-9209. According to this publication, a circuit having inductance and capacitor connected in series is arranged in parallel with the gap between the electrodes, and thereby, a conductive path between the electrodes after the generation of discharge is maintained, and the discharge state is stably continued so as to prevent a reduction of machining efficiency.

However, in this case, the extra capacitor must be inevitably added between the electrodes. For this reason, an electric capacitance on the voltage source side increases together with a stray capacitance of circuit. As a result, a rise time constant becomes large when the output voltage is applied between the electrodes, and therefore, the rise of inter-electrode voltage is delayed.

Accordingly, a voltage application time until the discharge is generated becomes long, and the number of effective discharge times is reduced; for this reason, a problem arises such that a machining efficiency is not sufficiently improved.

Moreover, by the value of the added inductance and capacitor, a natural vibration (oscillation) frequency is obtained. In recent years, a bipolar type power supply apparatus for electric discharge machining has been mainly used. In this type power supply apparatus, a polarity of voltage applied between the electrodes is alternately replaced, and then, oscillation output is made. In this case, the added capacitor repeats a charge and discharge operation by at least oscillation frequency of voltage application. Further, in a capacitor used for high frequency, an induction loss exists; for this reason, not only the oscillation frequency is limited, but also heat is generated by the induction loss. As a result, a problem arises such that supply energy loss is generated.

Therefore, an object of the present invention is to provide a power supply apparatus for electric discharge machining, which can stably maintain a conductive path formed between the electrodes without a disappearance of the formed path for the duration of delay time until a machining current is supplied from a pre-discharge in discharge machining, and can improve a discharge machining efficiency and quality without a fail of supply of the discharge machining current and unnecessary damage to an electrode and a workpiece.

DISCLOSURE OF THE INVENTION

The present invention provides a power supply apparatus for electric discharge machining, which includes first and second switching circuits connected in parallel with each other, supplies a pulse current to an inter-electrode distance an electrode and a workpiece from the first switching circuit, and subsequently, from the second switching circuit, and carries out discharge machining while controlling a relative position between the electrode and the workpiece, characterized in that the apparatus has a current loop including: a diode, which is supplied with a forward current at the same time a voltage for generating a discharge is output or before it; and a resistor, and blocks a supply of forward current to the diode the moment a discharge is generated, and further, outputs a reverse recovery current of the diode to in the gap between the electrode and the workpiece.

Therefore, the moment when a discharge is generated, the reverse recovery current of diode is output between the electrodes and the workpiece prior to the machining current output by the second switching circuit. By doing so, for the duration of the delay time from the pre-discharge to the supply of machining current in discharge machining, it is possible to stably maintain the conductive path formed between the electrodes without extinguishing the conductive path.

The power supply apparatus for electric discharge machining according to next invention further includes a semiconductor switching element for blocking the supply of forward current to the diode. Therefore, by the on-off control of the semiconductor switching element, the supply of forward current to the diode is blocked, and then, the moment when a discharge is generated, the reverse recovery current of diode is output in the gap between the electrode and the workpiece prior to the machining current output by the second switching circuit. By doing so, for the duration of the delay time from the pre-discharge to the supply of machining current in discharge machining, it is possible to stably maintain the conductive path formed between the electrodes without extinguishing the conductive path.

In the power supply apparatus for electric discharge machining according to next invention, there is provided a circuit configuration such that a reverse voltage is applied to both terminals of the diode the moment when a discharge is generated, and outputs a reverse recovery current of diode generated at that time in the gap between the electrode and the workpiece. Therefore, the moment when a discharge is generated, a reverse voltage is applied to both terminals of the diode, and the reverse recovery current of diode is output in the gap between the electrode and the workpiece prior to the machining current output by the second switching circuit, the moment when a discharge is generated. By doing so, for the duration of the delay time from the pre-discharge to the supply of machining current in discharge machining, it is possible to stably maintain the conductive path formed between the electrodes without extinguishing the conductive path.

Further, the present invention provides the power supply apparatus for electric discharge machining, characterized in that a plurality of diodes is connected in parallel or in series. Therefore, the number of diodes connected in parallel or in series is set to a proper value in accordance with a required current value of reverse recovery current.

Further, the present invention provides the power supply apparatus for electric discharge machining, characterized in that another direct current voltage source is provided as a direct current voltage source for supplying a forward current to the diode, except for the direct current voltage source constituting the first or second switching circuit. Therefore, a forward current is supplied to the diode by another direct current voltage source except for the direct current voltage source constituting the first or second switching circuit.

Further, the present invention provides the power supply apparatus for electric discharge machining, characterized in that the forward current of the diode is supplied from the direct current voltage source of the first switching circuit. Therefore, a forward current is supplied to the diode by the direct current voltage source constituting the first switching circuit.

Further, the present invention provides a power supply apparatus for electric discharge machining, which includes first and second switching circuits connected in parallel with each other, supplies a pulse current in the gap between an electrode and a workpiece from the first switching circuit, and subsequently, from the second switching circuit, and carries out discharge machining while controlling a relative position between the electrode and the workpiece, characterized in that the apparatus has a current loop including: a capacitor, which charges the capacitor at the same time a voltage for generating a discharge is output or before it; and a resistor, and outputs a discharge current from the capacitor in a gap between the electrode and the workpiece prior to a machining current output by the second switching circuit after a discharge is generated.

Therefore, after a discharge is generated, a discharge current from the capacitor is output in the gap between the electrode and the workpiece prior to the machining current output by the second switching circuit. By doing so, for the duration of the delay time from the pre-discharge to the supply of machining current in discharge machining, it is possible to stably maintain the conductive path formed between the electrodes without extinguishing the conductive path.

BRIEF DESCRIPTION OF THE DRAWINGS

FIG. 2(a) to FIG. 2(c) are individually views that explain the principle of reverse recovery current of diode;

BEST MODE FOR CARRYING OUT THE INVENTION

The present invention will be detailedly described below with reference to the accompanying drawings.

Figure 1:
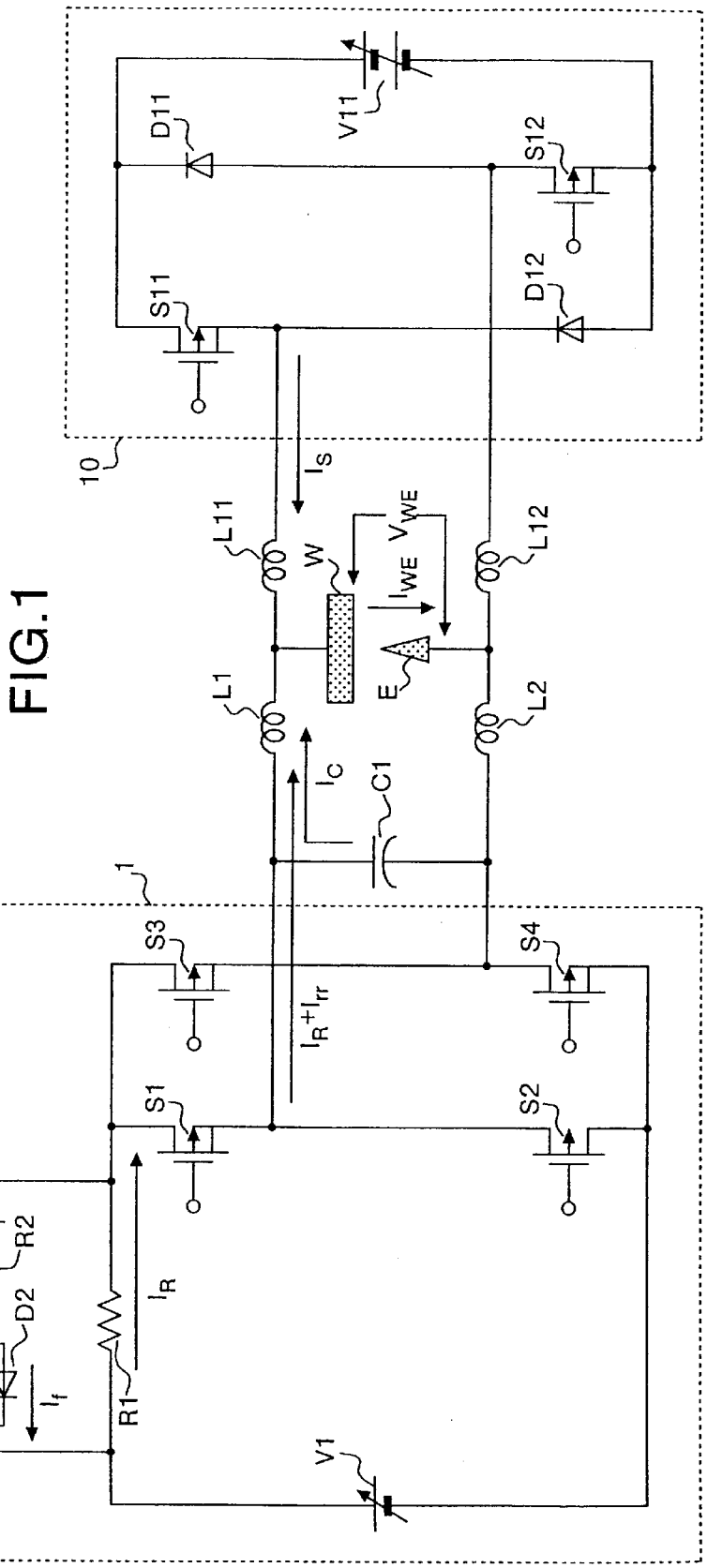
FIG. 1 is a block diagram showing a circuit configuration of power supply apparatus for electric discharge machining according to a first embodiment of the present invention.

FIG. 1 is a block diagram showing a circuit configuration of power supply apparatus for electric discharge machining according to a first embodiment of the present invention. The power supply apparatus for electric discharge machining has a first switching circuit 1 and a second switching circuit 10, which are connected to a workpiece W and an electrode E in parallel with each other, as a switching circuit for supplying a pulse current.

The first switching circuit 1 is composed of direct current voltage sources V1 and V3, semiconductor switching elements S1, S2, S3, S4 and S5 such as FET or the like, diodes D1 and D2 and resistors R1 and R2. On the other hand, the second switching circuit 10 is composed of a direct current voltage source V11, semiconductor switching elements S11 and S12 and diodes D11 and D12, and has the same configuration as the conventional switching circuit. In FIG. 1, L1, L2, L11 and L12 denote a stray inductance of the circuit, and C1 denotes a stray capacitance of the circuit.

The power supply apparatus for electric discharge machining supplies a pulse current in the following manner. More specifically, first, the pulse current is supplied in a gap between the electrode E and the workpiece W from the first switching circuit 1 according to an on-off control of the semiconductor switching elements S1 to S4 of the first switching circuit 1 and the semiconductor switching elements S11 and S12 of the second switching circuit 10. Subsequently, the pulse current is supplied in the gap between the electrode E and the workpiece W from the second switching circuit 10. The diodes D1 and D2 of the first switching circuit 1 are connected in parallel with each other, and are supplied with a forward current from the direct current voltage source V3 by the on/off of the semiconductor switching element S5 at the same time when outputting a voltage for generating a discharge or before it. Thus, these diodes D1 and D2 form a current loop inclusive of the resistor R2 as a circuit in parallel to the resistor R1. By the on-off control of the semiconductor switching element S5, the moment a discharge is generated, the supply of the forward current $I_f$ of the diodes D1 and D2 is interrupted. A reverse recovery current of the diodes D1 and D2 generated at that time is output to the gap between the electrode E and the workpiece W prior to a machining current output by the second switching circuit 10.

Namely, the circuit for generating the reverse recovery current of diode is composed of diodes D1 and D2, the direct current voltage source V3, the resistor R1, and the semiconductor switching element S5. More specifically, these diodes D1 and D2 are connected in parallel with each other as a circuit in parallel to the resistor R1, and the direct current voltage source V3 is connected to these diodes D1 and D2 in series. The semiconductor switching element S5 controls the turn on/off of the diodes D1 and D2 connected in parallel with a serial circuit comprising the resistor R1 and the direct current voltage source V3.

The principle of reverse recovery current of a general diode will be described below with reference to FIG. 2(a) to FIG. 2(c). This phenomenon has been already known; therefore, the explanation will briefly made. In a circuit shown in FIG. 2(a), when a switch SW is turned on, a forward current $I_f$ flows to a diode D. In this state, when the switch SW is turned off, a current is interrupted by a switching operation of the diode D; however, it is not instantaneously interrupted, as shown in FIG. 2(b), a reverse current $I_{rr}$ flow for a certain time. This is because a minority carrier remains in a pn-junction of the diode D. A time taken until the residual carrier disappears is a reverse recovery time $t_{rr}$, and for the duration, a reverse recovery charge $Q_{rr}$ is generated in a reverse direction. By the reaction, a reverse recovery current $I_{rr}$ is generated. The reverse recovery time $t_{rr}$ is about 50 ns when it short, and about 100 $\mu$s when it is long.

The reverse recovery current $I_{rr}$ of the diode D shows a characteristic as shown in FIG. 2(c), and does not so depend upon a magnitude of the forward current $I_f$, and receives a great influence by a current change ratio di/dt. In the case of a Schottky barrier diode, it is a minority carrier element; and therefore, the Schottky barrier diode basically has no phenomenon as described above.

Next, the following is a description on an operation of the power supply apparatus of the first embodiment having the above configuration. In a state that there is no discharge or short-circuit in the gap between the electrodes, when turning off the switching elements S2, S3 and S5 of the first switching circuit 1 while turning on the switching elements S1 and S4 thereof, a voltage of the direct current voltage source V1 appears in the gap between the electrodes. Simultaneously, the stray capacitance C1 is charged to the voltage of the direct current voltage source V1.

In this case, the switching elements S5 is turned off, and therefore, the forward current $I_f$ flows to the diodes D1 and D2 via the direct current voltage source V3, resistor R2, diodes D1 and D2, resistor R1 and direct current voltage source V3. A distance between the electrode E and the workpiece W is controlled to a proper value by a numerical control device (not shown) and a servo drive control device so that a discharge is generated in the gap between the electrodes. When a discharge is generated in the gap between the electrodes by an output voltage of the direct current voltage source V1, a charge charged in the stray capacitance C1 of the circuit is first discharged in the gap between the electrodes, and then, a discharge start current $I_C$ flows, and thereby, a conductive path is formed between the electrodes.

In order to maintain the conductive path thus formed, a current must be continuously supplied in the gap between the electrodes after the charge of the stray capacitance C1 of the circuit has been fully discharged; for this reason, the switching elements S1 and S4 are intactly turned on while the switching elements S2 and S3 being turned off.

The switching element S5 is turned on at the same time with the generation of discharge, and thereby, the supply of forward current $I_f$ to the diodes D1 and D2 is interrupted; as a result, a reverse recovery current $I_{rr}$ flows to these diodes D1 and D2. The reverse recovery current $I_{rr}$ flows to the diodes D1 and D2, switching element S5, switching element S1, circuit inductance L1, workpiece W, electrode E, circuit inductance L2, switching element S4, direct current voltage source V1 and diodes D1 and D2 in succession. Namely, the reverse recovery current $I_{rr}$ is output in the gap between the electrodes. The reverse recovery current $I_{rr}$ is shown by a waveform ID of FIG. 3. However, in order to unify a current direction in the gap between the electrodes, the reverse recovery current $I_{rr}$ is shown with the polarity reverse to the waveform shown in FIG. 2(b).

For that duration, the switching elements S1 and S4 are turned on while the switching elements S2 and S3 being turned off. Therefore, from the direct current voltage source V1, a discharge holding current $I_R$ flows to the resistor R1, switching element S1, circuit inductance L1, workpiece W, electrode E, circuit inductance L2, switching element S4 and direct current voltage source V1 in succession.

Accordingly, a current of $I_R+I_{rr}$ is output in the gap between the electrodes from the first switching circuit 1. The output current $I_R+I_{rr}$ is used to maintain the conductive path formed in the gap between the electrodes by the discharge start current $I_C$. However, these currents have a relatively small current value, and are weak as machining (working) energy. For this reason, these current have a function as a pre-discharge current for supplying a large-current discharge machining current $I_S$, which will be described later.

Moreover, when turning off the switching elements S1 and S4 while turning on the switching elements S2 and S3, the above operation is carried out in a pattern of reversing a polarity of output voltage and current with respect to the gap between the electrodes.

The large-current discharge machining current $I_S$ output from the second switching circuit 10 is output in the gap between the electrodes after a delay of certain time from the first generation of discharge because it is supplied after the generation of discharge is detected. More specifically, before the switching elements S11 and S12 are driven on, there exists a delay time due to operation processing and oscillation control for setting an on-time in accordance with a machining state, time to drive the switching elements S1 and S2, etc. When the switching elements S1, S4, S11 and S12 are all on state, this forms a circuit such that a plurality of direct current voltage sources having different voltage are connected. For this reason, there is a possibility of breaking down these elements of the circuit by a potential difference including a serge voltage. Thus, in the case of turning on the switching elements S11 and S12, the switching elements S1 and S4 are turned off as safety measures.

The switching elements S11 and S12 are simultaneously turned on, and thereby, from the direct current voltage source V11, a large-current discharge machining current $I_S$ flows to the switching element S11, circuit inductance L11, workpiece W, electrode E, circuit inductance L12, switching element S12 and direct current voltage source V11 in succession.

After the preset on time elapses, these switching elements S11 and S12 are turned off. However, in this case, the discharge machining current $I_S$ continuously flows through the circuit by the induction of the circuit inductances L11 and L12, and then, is fed back and regenerated to the direct current voltage source V11 via the diode D12, circuit inductance L11, workpiece W, electrode E, circuit inductance L12 and diode 11.

Figure 3:
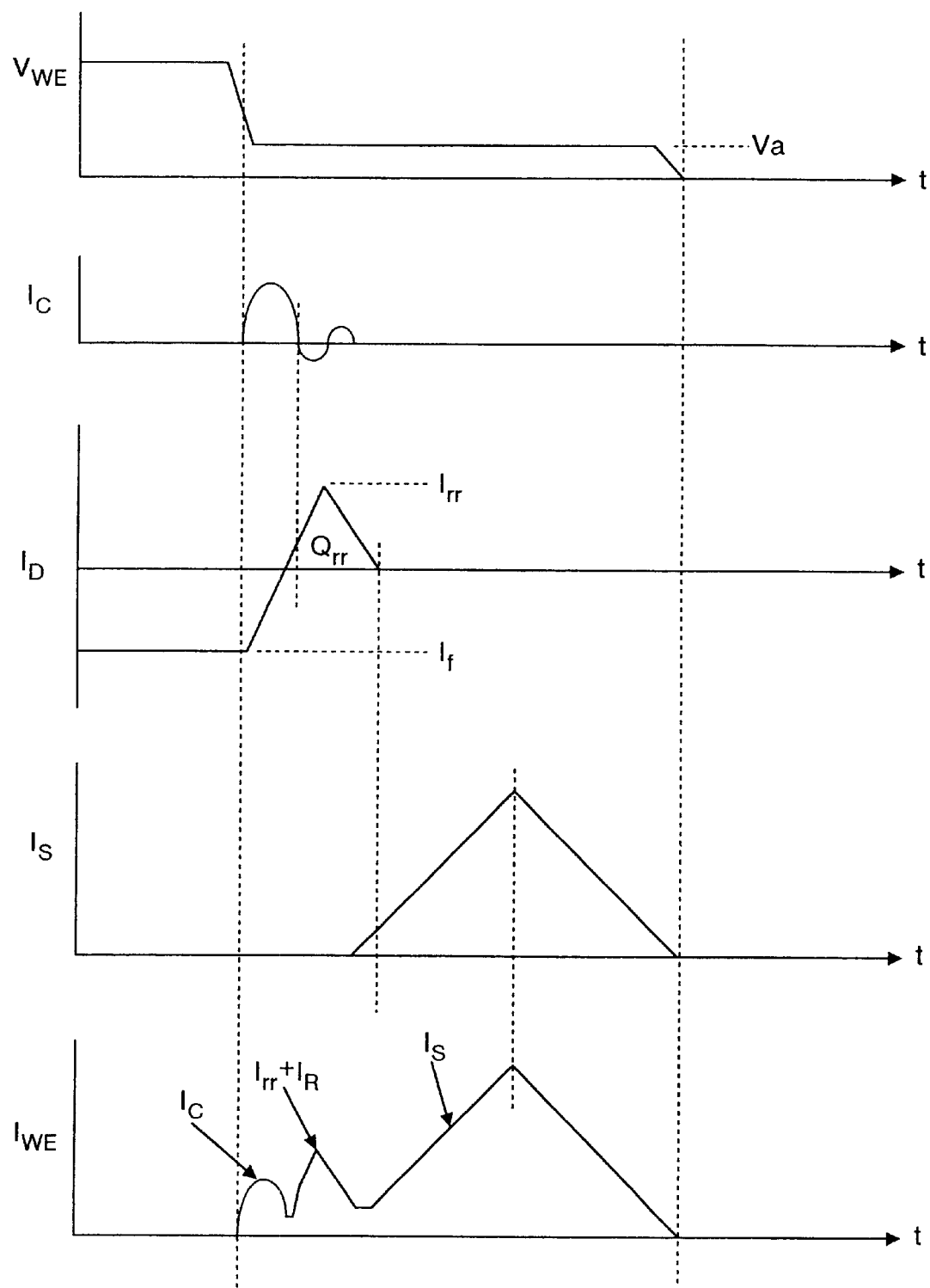
FIG. 3 is a chart showing a current waveform obtained by an operation of the power supply apparatus for electric discharge machining according to the first embodiment of the present invention.

FIG. 3 shows a waveform of discharge machining current obtained by the above operation of the power supply apparatus. In FIG. 3, $V_{WE}$ denotes an inter-electrode voltage, and $I_C$ denotes a discharge start current by capacitor discharge of the stray capacitance C1 of circuit. Further, ID denotes a current of the diodes D1 and D2, and $I_S$ denotes a discharge machining current output from the second switching circuit 10. Further, $I_R$ denotes a discharge holding current output from the first switching circuit 1, and $I_{WE}$ denotes an inter-electrode current.

After the discharge is generated in the gap between the electrodes, a delay time until the discharge machining current $I_S$ appears is usually about 400 ns, and a pulse width of capacitor discharge of the discharge start current $I_C$ is about 350 ns. In this case, a period having a possibility that the inter-electrode current is interrupted is about 50 ns.

However, the time when a reverse recovery current $I_{rr}$ of the diodes D1 and D2 is generated, that is, a reverse recovery time $t_{rr}$ is about 100 ns or more. Therefore, for the duration of the delay time until the discharge machining current appears $I_S$ after the discharge start current $I_C$ is output, it is possible to maintain the conductive path formed in the gap between the electrodes by the reverse recovery current $I_{rr}$ without interrupting the inter-electrode current.

In this case, only two diodes D1 and D2 have been used for generating the reverse recovery current $I_{rr}$. In order to obtain a necessary reverse recovery current $I_{rr}$, many diodes more than two may be connected in parallel or in series. Further, the inter-electrode current $I_{WE}$ appearing in the gap between the electrodes is $I_{WE}=I_C+I_R+I_{rr}+I_S$. Therefore, the entire section of current waveform increases by the reverse recovery current $I_{rr}$ as compared with the conventional case. Therefore, a machining (working) energy is increased, and a machining efficiency is improved in the case of making a comparison based on the same discharge frequency.

The switching elements S11 and S12 may be an element having a late switching response time so long as it is possible to maintain the conductive path formed in the gap between the electrodes by the reverse recovery current $I_{rr}$ of the diodes D1 and D2 for the duration of the delay time between the discharge start current $I_C$ and the discharge machining current $I_S$.

In general, the semiconductor switching element has a tendency for switching response time to be late when a rated capacity becomes large. If the semiconductor switching element has no hindrance to having a late switching response time, IGBT and power module may be used. The IGBT module has a large capacitance even if it is one element, and there is no need of combining many elements in parallel in the case where a current capacitance is required; therefore, the power supply apparatus can be miniaturized.

Figure 4:
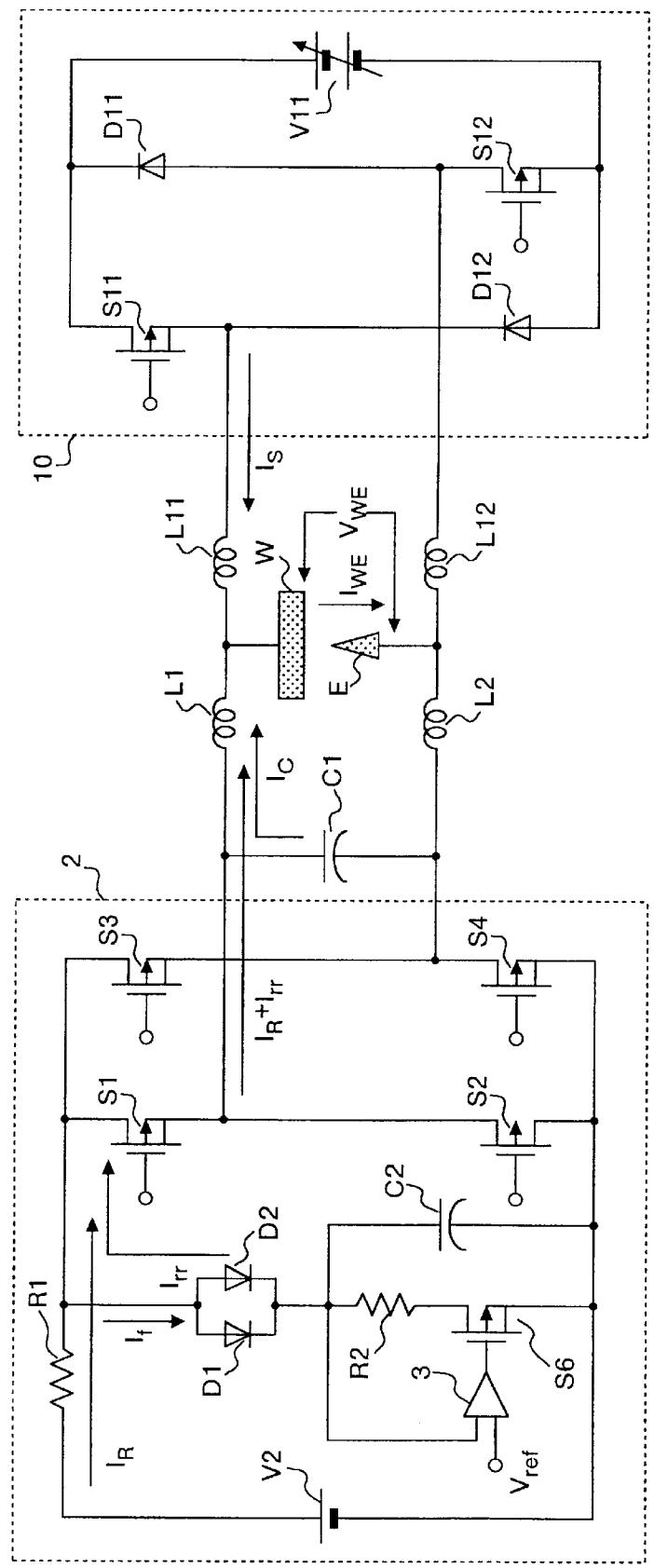
FIG. 4 is a block diagram showing a circuit configuration of power supply apparatus for electric discharge machining according to a second embodiment of the present invention.

FIG. 4 is a block diagram showing a circuit configuration of power supply apparatus for electric discharge machining according to a second embodiment of the present invention. In FIG. 4, the same reference numerals as given in FIG. 1 are used to designate the portions corresponding to FIG. 1, and the details are omitted.

In this second embodiment, a direct current voltage source for discharge holding current $I_R$ of a first switching circuit 2 and a direct current voltage source of the diodes D1 and D2 are composed of a common direct current voltage source V2. Further, a resistor R2 and a semiconductor switching element S6 are connected in series with a parallel circuit comprising the diodes D1 and D2, and a smoothing capacitor C2 is connected in parallel with a serial circuit comprising the resistor R2 and the semiconductor switching element S6. In this case, the semiconductor switching element S6 is controlled according to PWM (pulse width modulation) by a PWM control circuit 3.

An output voltage of the direct current voltage source V2 is applied to both terminals of the smoothing capacitor C2 via the resistor R1, the diodes D1 and D2. The PWM control circuit 3 feeds back the voltage applied to both terminals of the smoothing capacitor C2 while detecting a difference between a reference voltage $V_{ref}$ set from the outside and the fed-back voltage, and controls the switching element S6 connected to the resistor R2 in series according to the PWM. By doing so, the PWM control circuit 3 controls both terminal voltage of the smoothing capacitor C2 to a constant voltage having a desired value.

The difference between the output voltage of the direct current voltage source V2 and both terminal voltage of the smoothing capacitor C2 is offset by the resistor R1. Thus, if a circuit loss is disregarded, a voltage appearing in the gap between the electrodes is both terminal voltage of the smoothing capacitor C2. Namely, in this case, the voltage applied to the inter-electrode is variable by the PWM control circuit 3; therefore, the output voltage of the direct current voltage source V2 has no need of being a variable voltage.

Next, the following is a description on an operation of the power supply apparatus of the second embodiment having the above configuration. In a state that there is no discharge or short-circuit in the gap between the electrodes, when turning off the switching elements S2 and S3 of the first switching circuit 2 while turning on the semiconductor switching elements S1 and S4, a voltage across its terminals of the smoothing capacitor C2 appears in the gap between the electrodes. Simultaneously, the stray capacitance Cl of the circuit is charged to the voltage across its terminals of the smoothing capacitor C2. In this case, a forward current $I_f$ has already flown to the diodes D1 and D2 via the direct current voltage source V2, resistor R1, diodes D1 and D2, smoothing capacitor C2 and direct current voltage source V2.

When a discharge is generated, the inter-electrode voltage becomes lower than the voltage across its terminals of the smoothing capacitor C2. For this reason, the voltage across its terminals of the diodes D1 and D2 have a reversed polarity, and the supply of forward current $I_f$ to the diodes D1 and D2 is interrupted; as a result, a reverse recovery current $I_{rr}$ is generated. The reverse recovery current $I_{rr}$ flows to the diodes D1 and D2, switching element S1, circuit inductance L1, workpiece W, electrode E, circuit inductance L2, switching element S4, smoothing capacitor C2, diodes D1 and D2 in succession, and thereby, the reverse recovery current $I_{rr}$ is output in the gap between the electrodes. The operation after that is the same as the above first embodiment. Therefore, in this second embodiment, the same effect as the first embodiment can be obtained.

Figure 5:
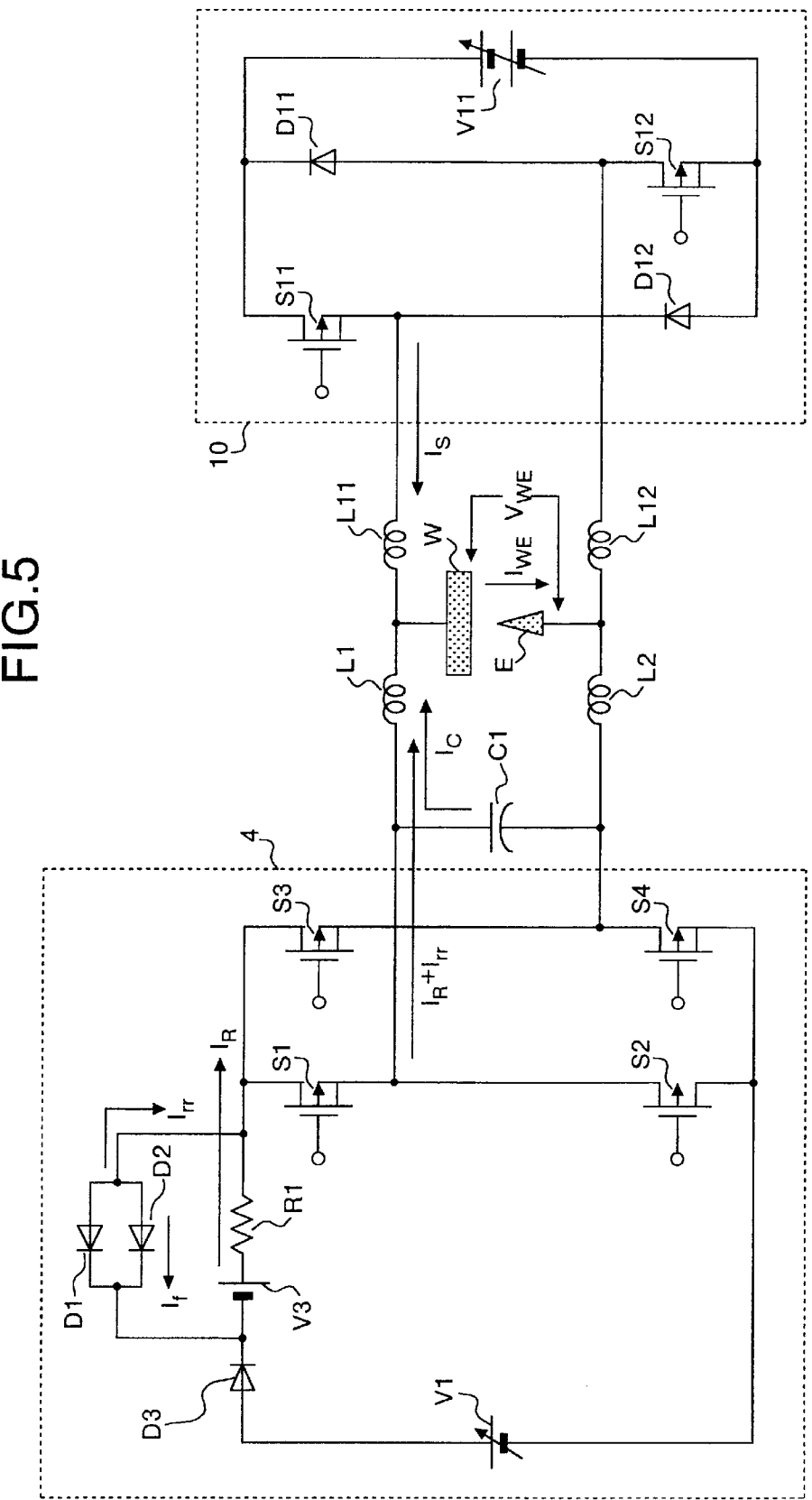
FIG. 5 is a block diagram showing a circuit configuration of power supply apparatus for electric discharge machining according to a third embodiment of the present invention.

FIG. 5 is a block diagram showing a circuit configuration of power supply apparatus for electric discharge machining according to a third embodiment of the present invention. In FIG. 5, the same reference numerals as given in FIG. 1 are used to designate the portions corresponding to FIG. 1, and the details are omitted.

In this third embodiment, a direct current voltage source V3 is provided in a main circuit of a first switching circuit 4 in series with a direct current voltage source V1 and a resistor R1 of the first switching circuit 4. Further, a circuit for generating a reverse recovery current of diode forms a current loop such that the diodes Di and D2 connected in parallel are connected in parallel with the direct current voltage source V3 and the resistor R1, a forward current is supplied to these diodes D1 and D2 by the direct current voltage source V3 and the resistor R1. In this case, a voltage generated by the direct current voltage source V3 is set lower than a voltage generated by the direct current voltage source V1.

In the above circuit, when the semiconductor switching elements S1 and S4 are turned on, the diodes Di and D2 are biased in reverse by a voltage applied from the direct current voltage source V1, and thereby, a reverse recovery current $I_{rr}$ is generated in these diodes Di and D2. The reverse recovery current $I_{rr}$ is output in the gap between the electrode E and the workpiece W prior to a machining current output by the second switching circuit 10, like the above first embodiment.

By doing so, after the discharge start current $I_C$ is output, it is possible to supply the reverse recovery current $I_{rr}$ in the gap between the electrodes before the discharge machining current $I_S$ is supplied via the second switching circuit 10, and to prevent an inter-electrode current from being interrupted. Therefore, in this third embodiment, the same effect as the first embodiment can be obtained.

In the circuit configuration of this third embodiment, when viewing the first switching circuit 4 from the second switching circuit 10, the resistor R1 and the diodes D1 and D2 seems as if they are connected in parallel. In this case, the current direction from the second switching circuit 10 to the first switching circuit 4 is a forward direction of diodes D1 and D2. Apart of current supplied from the second switching circuit 10 flows into the direct current voltage source V1 via these diodes D1 and D2; for this reason, there is a possibility that the part of current gives a bad influence. In order to solve the above problem, in this third embodiment, the output of the direct current voltage source V1 is provided with a diode D3 for blocking the inflow of current from the second switching circuit 10.

As described above, according to the above first to third embodiments, the discharge start current $I_C$ is output, in order to prevent the inter-electrode current from being interrupted before the discharge machining current $I_S$ is supplied via the second switching circuit 10, the reverse recovery current $I_{rr}$ generated in the diodes D1 and D2 is used.

By doing so, for the duration of the delay time from the re-discharge to the supply of machining current in electric discharge machining, it is possible to stably maintain the conductive path formed in the gap between the electrodes without extinguishing the conductive path. In addition, it is possible to prevent a reduction of machining efficiency by a failure of the supply of machining current, and to prevent an unnecessary disconnection of electrode wire; therefore, machining efficiency and machining speed can be improved. Further, the machining current is smoothly supplied from the pre-discharge, and thereby, a machining surface roughness is prevented; therefore, machining accuracy and quality can be improved.

As described above, according to the present invention, it is possible to use a large-capacity element having a relatively low-speed switching response time; therefore, the number of elements can be reduced, and further, the entirety of power supply apparatus can be miniaturized and provided at a low cost.

Figure 6:
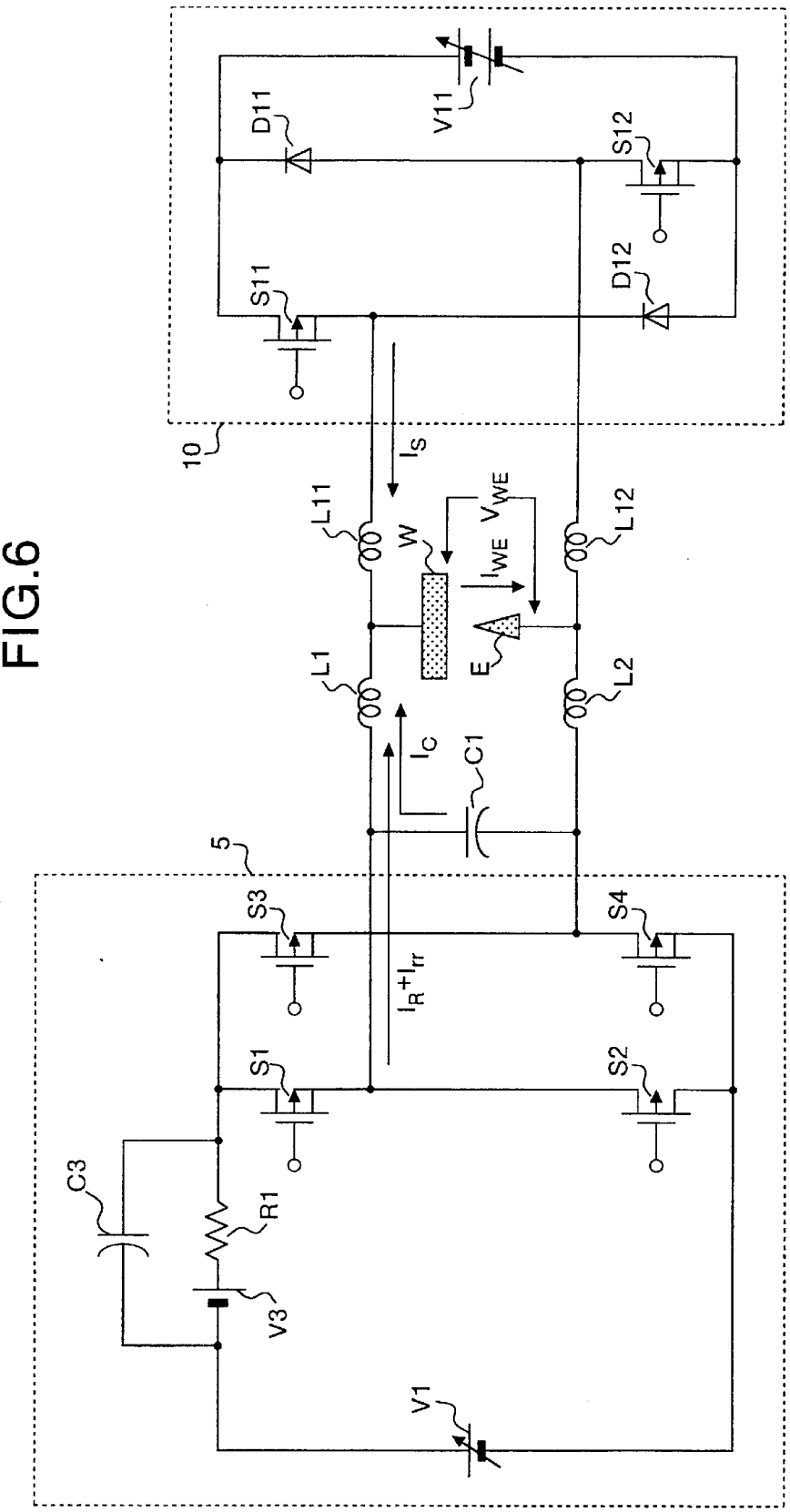
FIG. 6 is a block diagram showing a circuit configuration of power supply apparatus for electric discharge machining according to a fourth embodiment of the present invention.
Figure 7A:
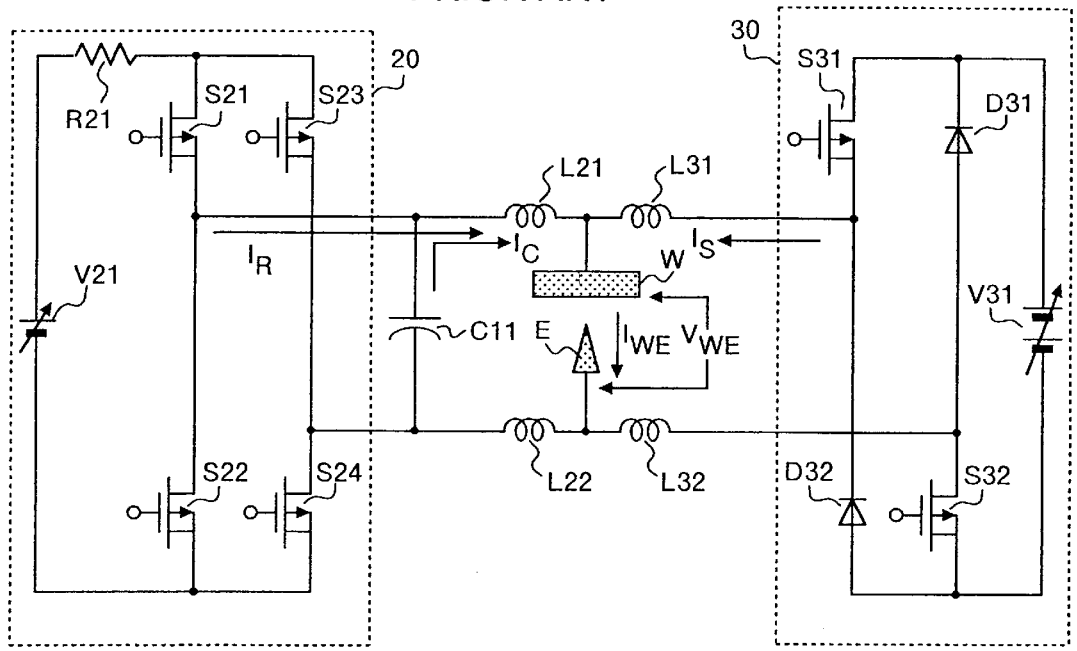
FIG. 7 is a block diagram showing a circuit configuration of a conventional power supply apparatus for electric discharge machining.
Figure 7B:
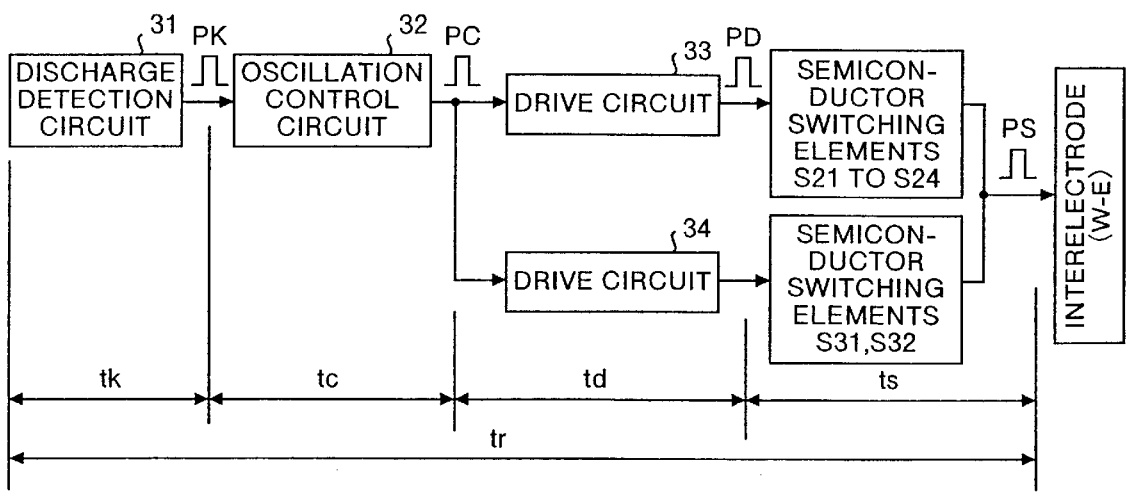
Figure 8:
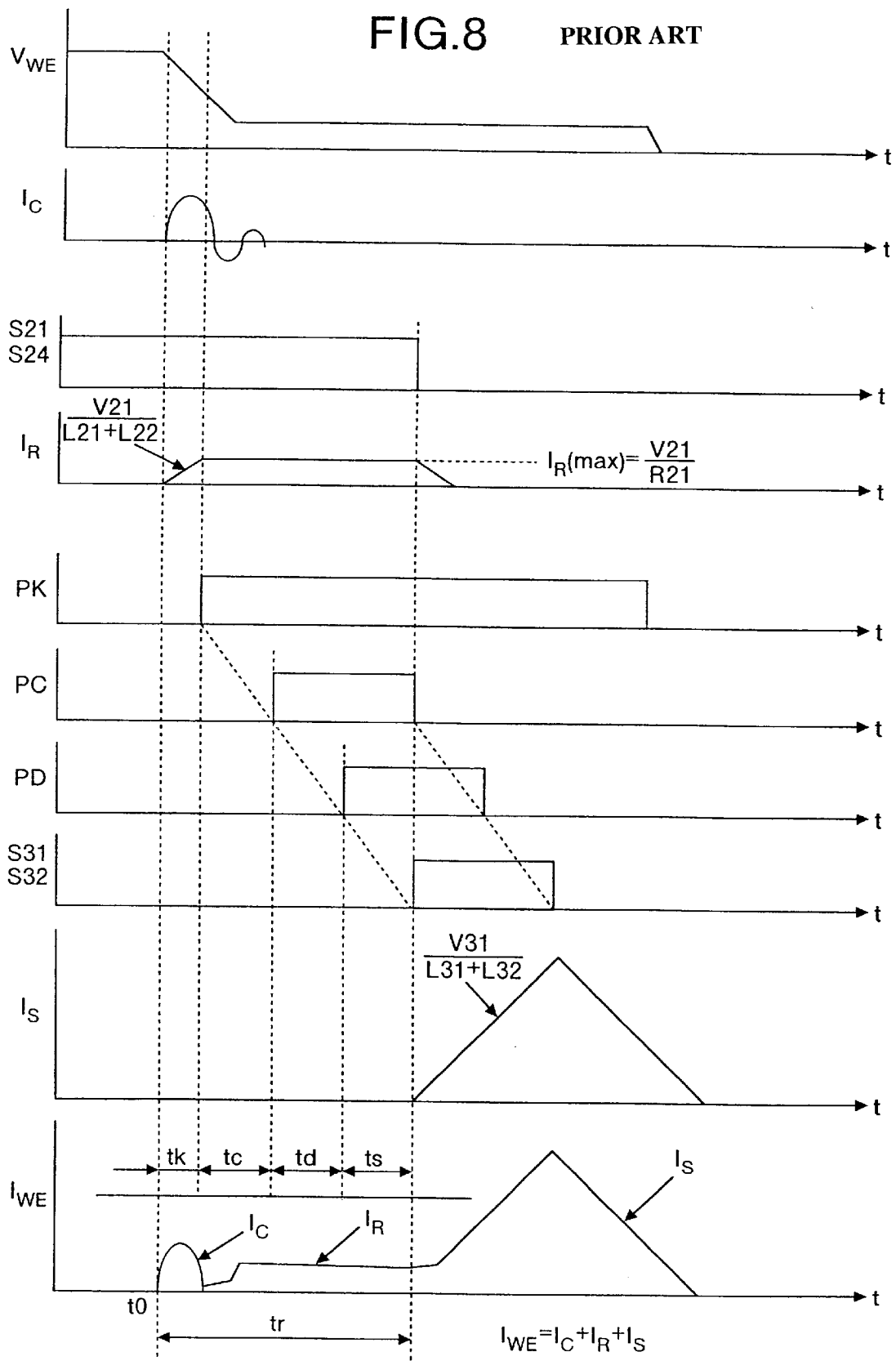
FIG. 8 is a view showing the operation principle of the conventional power supply apparatus for electric discharge machining and a current waveform.

FIG. 6 is a block diagram showing a circuit configuration of power supply apparatus for electric discharge machining according to a fourth embodiment of the present invention. In FIG. 6, the same reference numerals as given in FIG. 1 are used to designate the portions corresponding to FIG. 1, and the details are omitted.

In this fourth embodiment, a first switching circuit 5 is provided with a capacitor C3 for reinforcing a pre-discharge current, and is formed with a current charging loop for the capacitor C3, which is composed of a direct current voltage source V3, a resistor R1 and the capacitor c3.

Next, the following is a description on an operation of the power supply apparatus of the fourth embodiment having the above configuration. Before, the first switching circuit 5 and the second switching circuit 10 are operated, the capacitor C3 is charged by the current loop composed of the direct current voltage source V3, the resistor R1 and the capacitor C3. Subsequently, the semiconductor switching elements S1 and S4 of the first switching circuit 5 are simultaneously turned on, and thereby, a charge charged in the capacitor C3 is discharged, and then, is supplied in the gap between the electrodes via the switching elements S1 and S4.

By doing so, like the case where the reverse recovery current of diode is supplied in the gap between the electrodes as described in the above first to third embodiments, it is possible to prevent an inter-electrode current from being interrupted using a discharged current from the capacitor C3 before the discharge machining current $I_S$ is supplied via the second switching circuit 10. Therefore, in this fourth embodiment, the same effect as the first to, third embodiments can be obtained.

INDUSTRIAL APPLICABILITY

The present invention is applicable to a pulse supply source for an electric discharge machine such as a wire cut discharge machine or the like.

What is claimed is:

1. A power supply apparatus for electric discharge machining a workpiece, the power supply apparatus comprising:

an electrode;

a first switching circuit;

a second switching circuit connected parallel to said first switching circuit, wherein a pulse current is supplied in a gap between said electrode and said workpiece first by said first switching circuit and by said second switching circuit, and said workpiece is machined while controlling a relative position of said electrode and workpiece; and a current loop including a diode, which is supplied with a forward current at or prior to a time when a voltage for generating a discharge is output, wherein, when a discharge is generated, a supply of forward current to the diode is blocked and a reverse recovery current of said diode is output to the gap between said electrode and said workpiece.

2. The power supply apparatus for electric discharge machining according to claim 1, further comprising a semiconductor switching element for blocking the supply of forward current to said diode.

3. The power supply apparatus for electric discharge machining according to claim 1, further comprising a circuit configuration such that a reverse voltage is applied to the two terminals of said diode the moment a discharge is generated, wherein a reverse recovery current of said diode generated at that time is supplied to the gap between said electrode and said workpiece.

4. The power supply apparatus for electric discharge machining according to claim 1, wherein said current loop includes a plurality of said diodes connected in parallel or in series.

5. The power supply apparatus for electric discharge machining according to claim 1, further comprising another direct current voltage source as a direct current voltage source for supplying a forward current to the diode, except for the direct current voltage source constituting said first or second switching circuit.

6. The power supply apparatus for electric discharge machining according to claim 1, wherein the forward current of said diode is supplied from said direct current voltage source of said first switching circuit.

7. A power supply apparatus for electric discharge machining a workpiece, the power supply apparatus comprising:

an electrode;

a first switching circuit;

a second switching circuit connected parallel to said first switching circuit, wherein a pulse current is supplied in a gap between said electrode and said workpiece first by said first switching circuit and by said second switching circuit, and said workpiece is machined while controlling a relative position of said electrode and workpiece; and a current loop including a capacitor, which charges the capacitor at or prior to a time when a voltage for generating a discharge is output, wherein a discharge current from said capacitor is supplied in the gap between said electrode and said workpiece prior to a machining current output by said second switching circuit after a discharge is generated.

* * * * *